United States Patent
Seto et al.

(10) Patent No.: US 12,291,263 B2
(45) Date of Patent: May 6, 2025

(54) VEHICLE CONTROL DEVICE AND CHARACTERISTIC ESTIMATION METHOD

(71) Applicant: Hitachi Automotive Systems, Ltd., Hitachinaka (JP)

(72) Inventors: Shinji Seto, Tokyo (JP); Junya Takahashi, Tokyo (JP); Tomoaki Fujibayashi, Hitachinaka (JP); Hiroshi Nakano, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 862 days.

(21) Appl. No.: 17/056,141

(22) PCT Filed: Feb. 21, 2019

(86) PCT No.: PCT/JP2019/006462
§ 371 (c)(1),
(2) Date: Nov. 17, 2020

(87) PCT Pub. No.: WO2020/003597
PCT Pub. Date: Jan. 2, 2020

(65) Prior Publication Data
US 2021/0214004 A1    Jul. 15, 2021

(30) Foreign Application Priority Data
Jun. 26, 2018 (JP) .................. 2018-120416

(51) Int. Cl.
B62D 13/00 (2006.01)
B62D 5/04 (2006.01)
G01M 17/06 (2006.01)

(52) U.S. Cl.
CPC ........... *B62D 13/005* (2013.01); *B62D 5/046* (2013.01); *G01M 17/06* (2013.01)

(58) Field of Classification Search
CPC ..... B62D 13/005; B62D 13/00; G01M 17/06; B60W 2300/14; G01G 19/086
See application file for complete search history.

(56) References Cited

U.S. PATENT DOCUMENTS 6,157,295 A     12/2000  Steiner
9,120,359 B2 *   9/2015  Chiu ...................... B60D 1/30
(Continued)

FOREIGN PATENT DOCUMENTS

DE    19843826 A1    3/2000
DE    10154612 A1    5/2003
(Continued)

OTHER PUBLICATIONS

Office Action issued in corresponding German Application No. 11 2019 001 855.8 dated Jan. 3, 2022 with English translation.
(Continued)

*Primary Examiner* — James M McPherson
*Assistant Examiner* — Clint Pham
(74) *Attorney, Agent, or Firm* — Foley & Lardner LLP

(57) ABSTRACT

An object of the present invention is to estimate a center-of-gravity position and inertia moment of a trailer and supply the center-of-gravity position and inertia moment for control of an articulated vehicle so as to enable further stabilization of a posture of the articulated vehicle during traveling.
A vehicle control device of the present invention is a vehicle control device mounted on a tractor which pulls a trailer, and is provided with: a steering angle control unit that controls a steering angle of wheels of the tractor independently of steering by a driver; and a trailer characteristic estimation unit that estimates a characteristic of the trailer based on a behavior of the tractor during wheel steering by the steering angle control unit.

13 Claims, 5 Drawing Sheets

(56) References Cited

U.S. PATENT DOCUMENTS

| | | | | |
|---|---|---|---|---|
| 9,840,277 B1* | 12/2017 | Beech | ................ | B60D 1/62 |
| 2009/0032273 A1* | 2/2009 | Hahn | ................ | B62D 13/005 |
| | | | | 172/2 |
| 2009/0228182 A1 | 9/2009 | Waldbauer et al. | | |
| 2010/0198492 A1 | 8/2010 | Watanabe | | |
| 2011/0202238 A1* | 8/2011 | Cebon | ................ | B62D 13/00 |
| | | | | 701/41 |
| 2014/0136052 A1 | 5/2014 | Kossira et al. | | |
| 2017/0297619 A1* | 10/2017 | Lavoie | ............. | B62D 15/024 |
| 2018/0065662 A1* | 3/2018 | Kim | ................ | B62D 7/159 |

FOREIGN PATENT DOCUMENTS

| | | |
|---|---|---|
| DE | 10 2010 050 474 A1 | 5/2012 |
| JP | H04-126675 A | 4/1992 |
| JP | 2000-019002 A | 1/2000 |
| JP | 2000-028427 A | 1/2000 |
| WO | WO-2007/060135 A1 | 5/2007 |
| WO | WO-2008/062867 A1 | 5/2008 |

OTHER PUBLICATIONS

International Search Report with English translation and Written Opinion issued in corresponding application No. PCT/JP2019/006462 dated April 2, 20109.

* cited by examiner (a) RELATIONSHIP BETWEEN INERTIA MOMENT AND GAIN DURING STEERING ANGLE CONTROL AT 0.5Hz (b) RELATIONSHIP BETWEEN REFERENCE CENTER-OF-GRAVITY POSITION AND GAIN DURING STEERING ANGLE CONTROL AT 0.5Hz (a) RELATIONSHIP BETWEEN INERTIA MOMENT AND GAIN DURING STEERING ANGLE CONTROL AT 1.0Hz (b) RELATIONSHIP BETWEEN REFERENCE CENTER-OF-GRAVITY POSITION AND GAIN DURING STEERING ANGLE CONTROL AT 1.0Hz

VEHICLE CONTROL DEVICE AND CHARACTERISTIC ESTIMATION METHOD

TECHNICAL FIELD

The present invention relates to a vehicle control device that controls a motion of a vehicle, and a characteristic estimation method used in the vehicle control device, and particularly relates to a vehicle control device and a characteristic estimation method for estimating characteristics of a trailer to be pulled and further stabilizing a motion of an articulated vehicle when a trailer is pulled using the estimated characteristics for vehicle control.

BACKGROUND ART

For example, PTL 1 is known as a conventional technique for stabilizing a posture of a tractor that pulls a trailer (hereinafter, referred to as "articulated vehicle").

According to claim 1 of the document describes "a vehicle mass estimation device including: a brake pressure sensor that detects a fluid pressure of a brake; a wheel rotation sensor that detects a wheel rotation speed; a means for calculating a time differential value of a vehicle speed obtained based on an output of the wheel rotation sensor to calculate an acceleration and a deceleration of a vehicle; a map in which a relationship between the deceleration of the vehicle and the fluid pressure of the brake is recorded in advance using vehicle mass as a parameter, and a means for estimating relevant mass on the map based on a characteristic of the deceleration calculated by the calculating means with respect to the fluid pressure of the brake measured by the brake pressure sensor when the time differential value indicates a deceleration state."

CITATION LIST

Patent Literature

PTL 1: JP 2000-19002 A

SUMMARY OF INVENTION

Technical Problem

In PTL 1, the mass of an articulated vehicle including a tractor and a trailer is estimated, but a center-of-gravity position and inertia moment that affect a lateral motion of the articulated vehicle are not estimated, and thus, a posture of the articulated vehicle during turning is not stable when the center-of-gravity position or the inertia moment of the trailer changes due to the influence of a cargo to be loaded.

Therefore, an object of the present invention is to estimate a center-of-gravity position and inertia moment of a trailer and supply the center-of-gravity position and inertia moment for control of an articulated vehicle so as to enable further stabilization of a posture of the articulated vehicle during turning.

Solution to Problem

In order to achieve the above object, a vehicle control device of the present invention is mounted on a tractor which pulls a trailer, and is provided with: a steering angle control unit that controls a steering angle of wheels of the tractor independently of steering by a driver; and a trailer characteristic estimation unit that estimates a characteristic of the trailer based on a behavior of the tractor during wheel steering by the steering angle control unit.

Further, a characteristic estimation method of the present invention is a characteristic estimation method for estimating a characteristic of a trailer pulled by a tractor, and includes: a steering angle control step of controlling a steering angle of wheels of the tractor independently of steering by a driver; and a characteristic estimation step of estimating a characteristic of the trailer based on a behavior of the tractor during wheel steering in the steering angle control step.

Advantageous Effects of Invention

According to the present invention, since the center-of-gravity position of the trailer and the inertia moment are estimated to be supplied for the control of the articulated vehicle, and thus, it is possible to further stabilize the posture of the articulated vehicle during traveling.

DESCRIPTION OF EMBODIMENTS

Hereinafter, embodiments of the present invention will be described with reference to the drawings.

First Embodiment

A first embodiment of the present invention will be described with reference to FIGS. 1 to 5.

Figure 1:
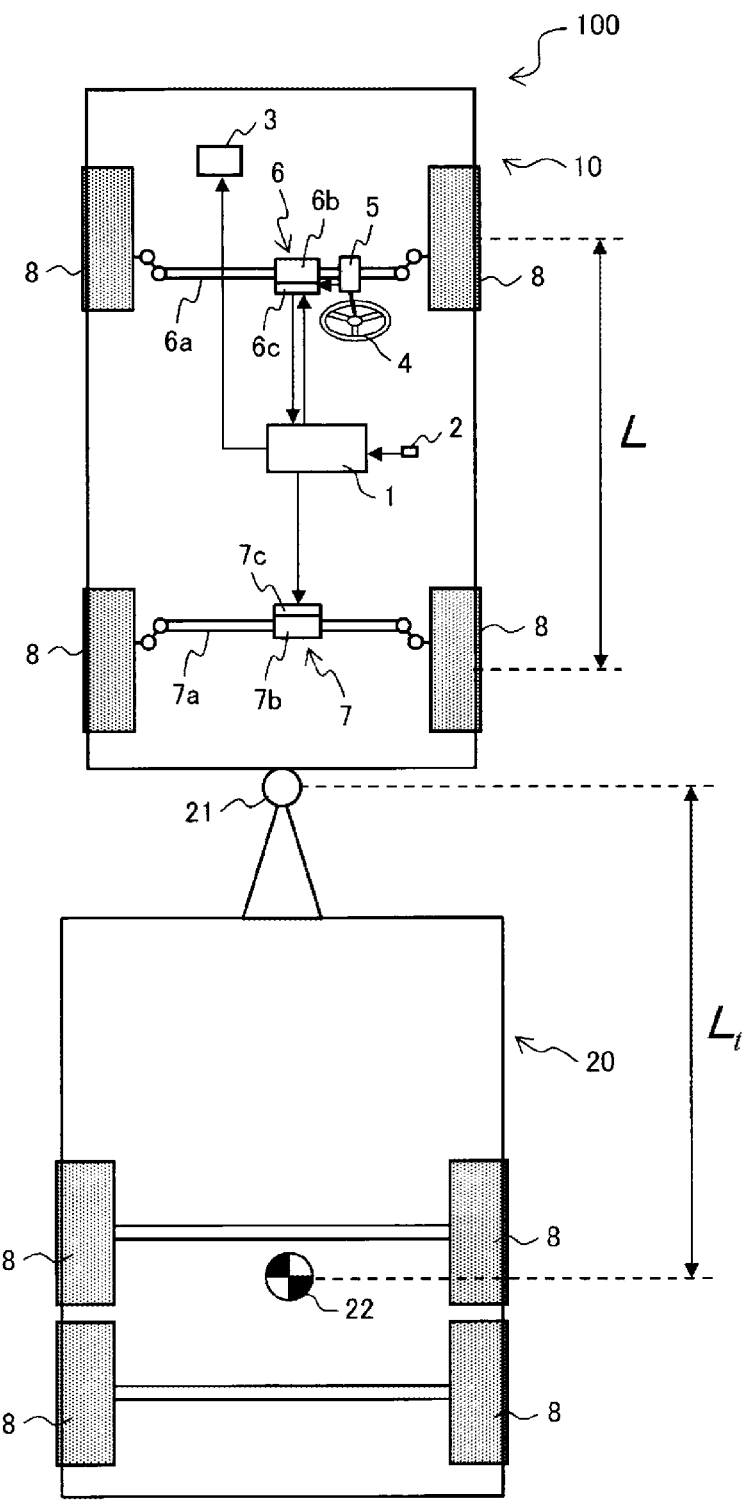
FIG. 1 is a schematic diagram of an articulated vehicle of a first embodiment.

FIG. 1 is a schematic diagram illustrating a configuration of an articulated vehicle 100 according to the first embodiment. As illustrated here, the articulated vehicle 100 of the present embodiment is obtained by connecting a tractor 10 on which a driver rides and a trailer 20 on which a cargo is loaded by a connection unit 21 which allows rotation about a rotation axis in a direction perpendicular to the plane of the drawing. Hereinafter, a distance between a front wheel axle and a rear wheel axle of wheels 8 of the tractor 10 is referred to as a tractor axle distance L, and a distance from the connection unit 21 to a center-of-gravity position 22 of the trailer 20 is referred to as a trailer center-of-gravity distance $L_t$.

The tractor 10 is equipped with not only a vehicle control device 1 according to the present embodiment but also a device equivalent to a conventional tractor such as a steering wheel 4. Incidentally, the vehicle control device 1 is a computer including a computing device such as a CPU, a main storage device such as a semiconductor memory, an auxiliary storage device such as a hard disk, and hardware such as a communication device. Then, the computing device executes a program loaded in the main storage device while referring to a database recorded in the auxiliary storage device to realize each function to be described later. Hereinafter, a description will be given while omitting such well-known techniques as appropriate.

Further, the tractor 10 is equipped with a drive system (an engine, a transmission, a brake device, and the like (not illustrated)), that controls an acceleration and control units (an ECU, an ATCU, a brake control device 3, and the like (not illustrated)) that control this drive system. Further, the tractor 10 includes: the vehicle control device 1 that transmits a command to each of the control units; a vehicle state sensor 2 that acquires vehicle motion state information, a front wheel power steering device 6, a rear wheel power steering device 7, and a communication line connecting these. The vehicle state sensor 2 is a sensor that acquires a yaw rate of the tractor 10, an acceleration in the front-rear direction, an acceleration in the left-right direction, a wheel speed of each wheel, and the like, and is practically constituted by a plurality of sensors.

The front wheel power steering device 6 includes: a steering wheel 4; a steering sensor 5 which detects a steering torque and a steering angle when a driver steers the steering wheel 4; a front wheel rack shaft 6a which is connected to front wheels via a link; a front wheel power steering motor 6b which applies thrust to the front wheel rack shaft 6a; and a front wheel steering angle control unit 6c which gives a command to the front wheel power steering motor 6b based on a value detected by the steering sensor 5. This front wheel power steering device 6 causes the front wheel power steering motor 6b to generate the thrust based on the torque (and/or steering angle) generated by the driver steering the steering wheel 4 and detected by the steering sensor 5, thereby assisting the driver's operation.

Similarly, the rear wheel power steering device 7 includes: a rear wheel rack shaft 7a connected to the rear wheels via a link; a rear wheel power steering motor 7b configured to apply thrust to the rear wheel rack shaft 7a; and a rear wheel steering angle control unit 7c which gives a command to the rear wheel power steering motor 7b based on a command from the vehicle control device 1. This rear wheel power steering device 7 can steer the rear wheels by causing the rear wheel power steering motor 7b to generate the thrust based on the command from the vehicle control device 1 independent of the driver's operation on the steering wheel 4.

Next, a method for estimating a trailer characteristic according to the present embodiment will be described with reference to FIGS. 2 to 4.

Figure 2:
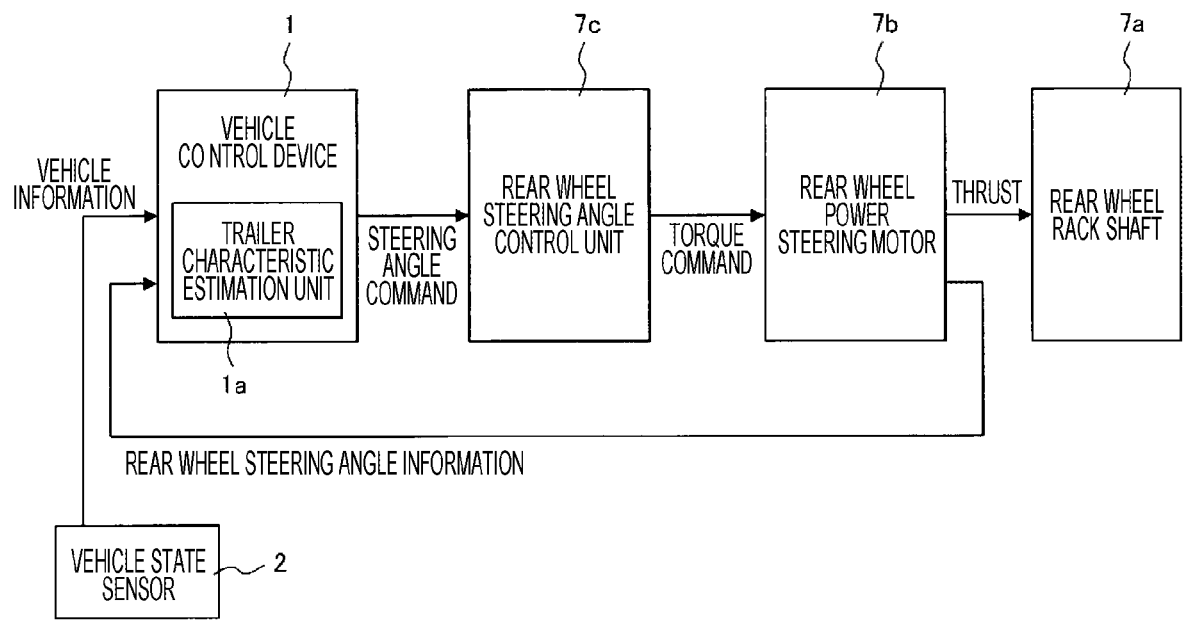
FIG. 2 is a block diagram of the main parts of the articulated vehicle of the first embodiment.

FIG. 2 is a block diagram of the main parts of the configuration used when the vehicle control device 1 of the tractor 10 estimates characteristics (center-of-gravity position and inertia moment) of the trailer 20, and illustrates the relationship among the respective elements of the vehicle control device 1 and the rear wheel power steering device 7, and a configuration in which a trailer characteristic estimation unit 1a is arranged in the vehicle control device 1. Incidentally, the characteristic estimation by the trailer characteristic estimation unit 1a is performed when the articulated vehicle 100 travels substantially straight at a substantially constant speed, and thus, FIG. 2 omits the illustration of the front wheel power steering device 6 controlled by steering of the steering wheel 4.

As illustrated here, in the case of estimating the characteristics of the trailer 20, the vehicle control device 1 gives a predetermined steering angle command to the rear wheel steering angle control unit 7c, which is independent of the steering by the driver, and the rear wheel steering angle control unit 7c gives a torque command based on the steering angle command to the rear wheel power steering motor 7b. The steering angle command given from the vehicle control device 1 to the rear wheel steering angle control unit 7c is, for example, a sine wave having a specific frequency and an amplitude, and a steering angle of the rear wheels of the tractor 10 changes in a sine wave shape according to the steering angle command. Incidentally, at this time, if a change in the steering angle of the rear wheels of the tractor 10 is large, the driver who is going to travel straight receives a sense of incompatibility, and thus, it is preferable to use a steering angle command so as to set a small steering angle restricted in amplitude such that a lateral acceleration of the tractor 10 has the magnitude (for example, 0.2 m/s$^2$ or less) at the degree that people hardly sense.

With the steering based on this steering angle command, a yaw rotation motion is generated in the tractor 10, and the lateral acceleration is generated, so that the vehicle state sensor 2 can detect the yaw rate and lateral acceleration vibration. At this time, a gain of the yaw rate and a phase due to a time delay can be detected from the yaw rate of the tractor 10 and the amplitude of the lateral acceleration vibration with respect to a rear wheel steering angle $\delta_r$ that changes at a constant frequency.

Since these gain and phase change according to the inertia moment and the center-of-gravity position of the trailer 20, the trailer characteristic estimation unit 1a of the vehicle motion control unit 1 estimates characteristics (parameters such as the center-of-gravity position and the inertia moment) of the trailer based on the observed gain and phase. Details of a method therefor will be described with reference to FIGS. 3 and 4.

Figure 3:
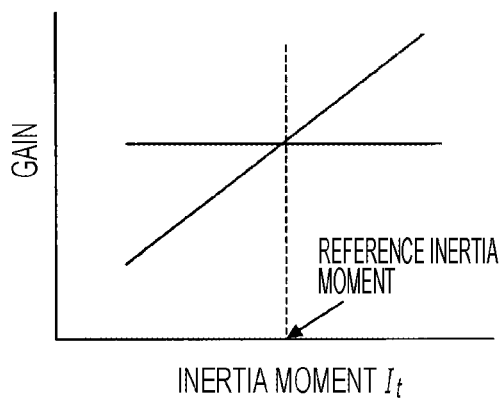
FIG. 3 is a graph illustrating a relationship between a gain of a tractor yaw rate and a trailer inertia moment or a center-of-gravity position when a rear wheel steering angle is slightly changed at a frequency of 0.5 Hz.
Figure 3:
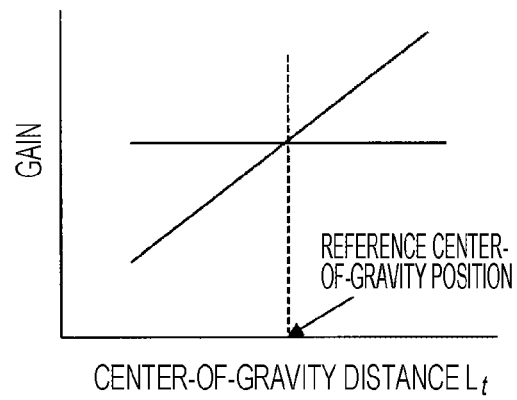

FIG. 3 is a graph illustrating the relationship between a gain of a tractor yaw rate and a trailer characteristic when the vehicle control device 1 slightly changes a rear wheel steering angle at a frequency of 0.5 Hz in the articulated vehicle 100 under a certain condition.

FIG. 3(a) is a graph illustrating the gain of the yaw rate with respect to the rear wheel steering angle when inertia moment $I_t$ of the trailer 20 changes from a reference value (reference inertia moment indicated by the broken line) while maintaining the other parameters as a result of changing a loading position of a cargo of the trailer 20 or the like. In this example, both of them have a substantially proportional relationship, and it can be seen that the gain increases or decreases as the inertia moment $I_t$ increases or decreases.

Further, FIG. 3(b) is a graph illustrating the gain of the yaw rate with respect to the rear wheel steering angle when a center-of-gravity distance $L_t$ changes from a reference value (reference center-of-gravity position indicated by the broken line) while maintaining the other parameters as a result of changing a loading position of a cargo of the trailer 20 or the like. In this example, both of them have a substantially proportional relationship, and it can be seen that the gain increases or decreases as the trailer center-of-gravity distance $L_t$ increases or decreases.

Figure 4:
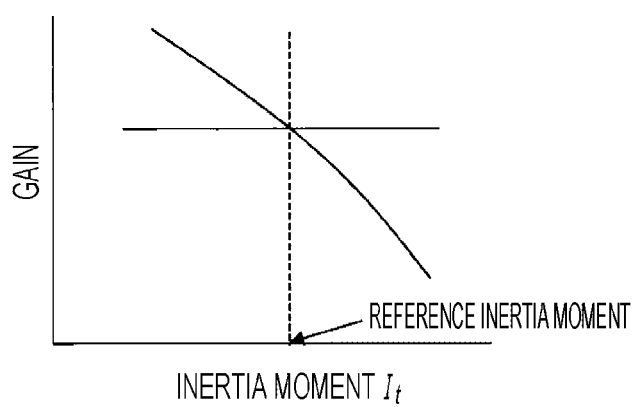
FIG. 4 is a graph illustrating a relationship between a gain of a tractor yaw rate and a trailer inertia moment or a center-of-gravity position when a rear wheel steering angle is slightly changed at a frequency of 1 Hz.
Figure 4:
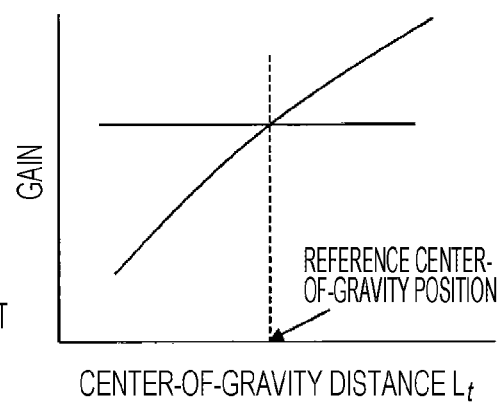
Figure 5:
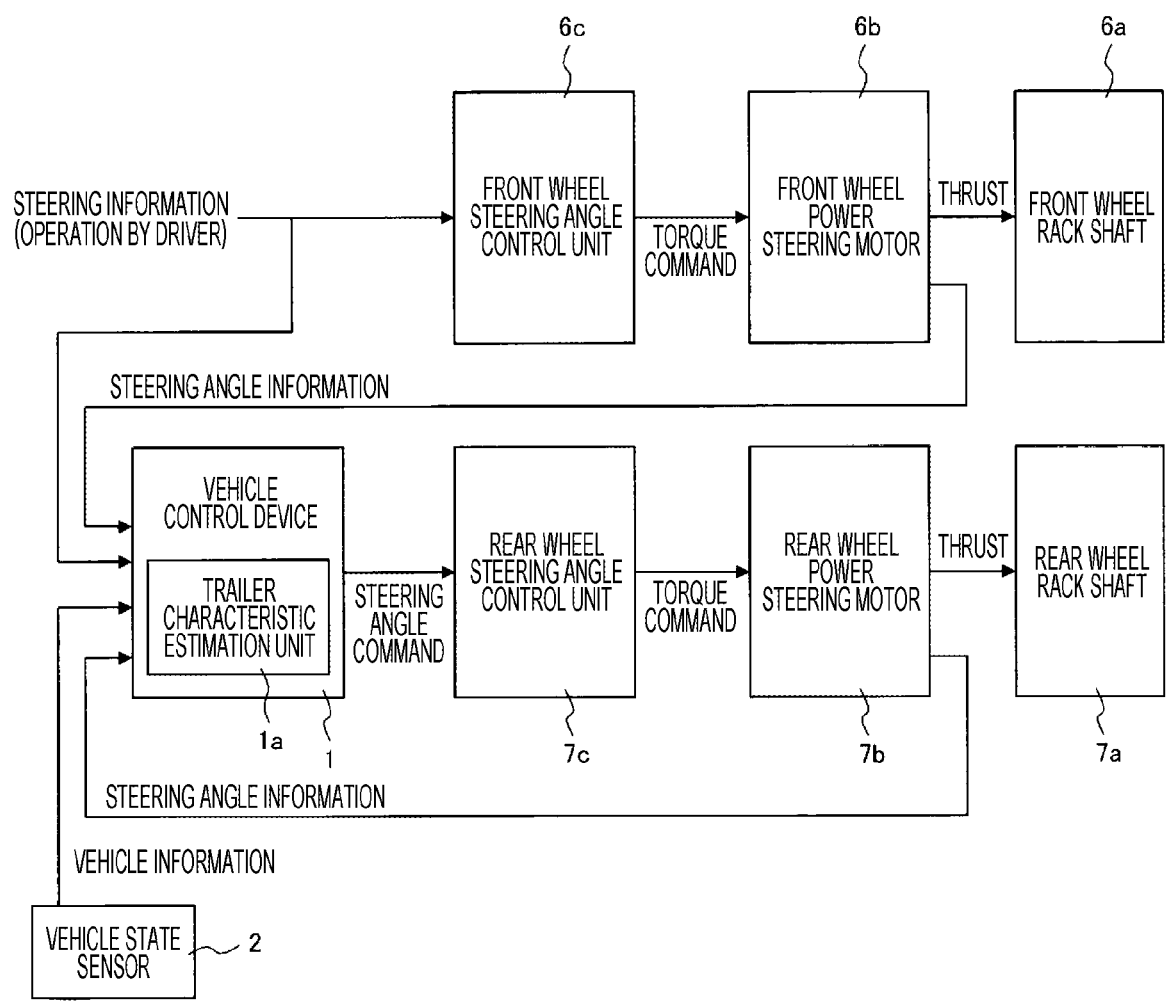
FIG. 5 is a block diagram illustrating a situation where the articulated vehicle is controlled using trailer characteristics estimated in the first embodiment.

On the other hand, FIG. 4 is a graph illustrating the relationship between a gain of a tractor yaw rate and a trailer characteristic when the vehicle control device 1 slightly changes a rear wheel steering angle at a frequency of 1 Hz in the articulated vehicle 100 under the same certain condition as that in FIG. 3.

As is clear from comparison of FIGS. 4(*a*) and (*b*) with FIGS. 3(*a*) and (*b*), a response that is very different from the case where the rear wheel steering angle is slightly changed at the frequency of 0.5 Hz is observed when the rear wheel steering angle is slightly changed at the frequency of 1 Hz. This is because responses of the gain and phase when the parameter is changed generally differ if the frequency of the steering angle is different.

A change amount $\Delta G_1$ from the reference value of the gain when the rear wheels of the tractor 10 are slightly steered at the frequency of 0.5 Hz is generally represented by the sum of change amounts of the gain for each factor when there are a plurality of factors of the change. Thus, for example, if two factors of the inertia moment and the trailer center-of-gravity distance described above are the factors of the change, it is possible to estimate that $\Delta G_1$ is the sum of a change amount caused by a change of the inertia moment and a change amount caused by a change of the center-of-gravity distance of the trailer.

Similarly, it is possible to estimate that a change amount $\Delta G_2$ from the reference value of the gain when the rear wheel steering angle of the tractor 10 is slightly steered at the frequency of 1 Hz is the sum of a change amount caused by a change of the inertia moment and a change of the center-of-gravity distance of the trailer.

Therefore, assuming that $\Delta G_1$ and $\Delta G_2$ can be expressed by a first-order approximation formula, both of them are expressed by (Formula 1) and (Formula 2), respectively.

[Math 1]

$$\Delta G_1 = AI_1 \times \Delta I_t + AL_1 \times \Delta L_t \quad \text{(Equation 1)}$$

[Math 2]

$$\Delta G_2 = AI_2 \times \Delta I_t + AL_2 \times \Delta L_t \quad \text{(Equation 2)}$$

Here, $\Delta I_t$ is a change amount from the reference value of the inertia moment of the trailer 20, $\Delta L_t$ is a change amount from the reference value of the trailer center-of-gravity distance, $AI_1$ is a slope when a change in gain relative to a change in $\Delta I_t$ at the time of slightly steering the rear wheels at the frequency of 0.5 Hz is approximated by a linear expression, $AL_2$ is a slope when a change in gain relative to a change in $\Delta L_t$ at the time of slightly steering the rear wheels at the frequency of 0.5 Hz is approximated by a linear expression; $AI_2$ is a slope when a change in gain relative to a change in $\Delta I_t$ at the time of slightly steering the rear wheels at the frequency of 1 Hz is approximated by a linear expression, and $AL_2$ is a slope when a change in gain relative to a change in $\Delta L_t$ at the time of slightly steering the rear wheels at the frequency of 1 Hz is approximated by a linear expression.

Here,

[Math 3]

$$\Delta G = \begin{bmatrix} \Delta G_1 \\ \Delta G_2 \end{bmatrix} \quad \text{(Equation 3)}$$

[Math 4]

$$A = \begin{bmatrix} AI_1 & AL_1 \\ AI_2 & AL_2 \end{bmatrix} \quad \text{(Equation 4)}$$

[Math 5]

$$\Delta x = \begin{bmatrix} \Delta I_t \\ \Delta L_t \end{bmatrix} \quad \text{(Equation 5)}$$

Then,

[Math 6]

$$\Delta x = A^{-1} \Delta G \quad \text{(Equation 6)}$$

Thus, $\Delta I_t$ and $\Delta L_t$ can be obtained. That is, the trailer characteristic estimation unit 1*a* can estimate the inertia moment $I_t$ and the center-of-gravity distance $L_t$ of the trailer 20 using the above Formulas 1 to 6.

As described above, when only the loading position is changed without changing the weight of the cargo loaded on the trailer 20, the trailer characteristic estimation unit 1*a* can estimate a desired characteristic of the trailer 20 using Formulas 1 to 6. However, it is necessary to use another estimation method if the weight of the cargo loaded on the trailer 20 changes.

Therefore, the following description will be given regarding a method for estimating a characteristic of the trailer 20 when there are three factors that change a gain of a tractor yaw rate, that is, the inertia moment, the trailer center-of-gravity distance, and the mass of the trailer.

In this case, it is possible to estimate that a change amount in gain is the sum of a change amount caused by a change of the inertia moment, a change amount caused by a change of the trailer center-of-gravity distance, and a change amount caused by the trailer mass. Therefore, the change amount in gain at three frequencies (for example, 0.5 Hz, 1 Hz, and 1.5 Hz) is expressed by Formulas 7 to 9.

Here, $\Delta G_n$ is a gain change amount of the n-th frequency, $\Delta I_n$ is a slope when the gain change amount relative to a change in inertia moment is approximated by a linear expression, $AL_n$ is a slope when a gain change amount relative to a change in trailer center-of-gravity distance is approximated by a linear expression, $Am_n$ is a slope when a gain change amount relative to a change in trailer mass is approximated by a linear expression, and $\Delta m_t$ is a change amount from a reference value of the trailer mass.

[Math 7]

$$\Delta G_1 = AI_1 \times \Delta I_t + AL_1 \times \Delta L_t + Am_1 \times \Delta m_t \quad \text{(Equation 7)}$$

[Math 8]

$$\Delta G_2 AI_2 \times \Delta I_t + AL_2 \times \Delta L_t + Am_2 \times \Delta m_t \quad \text{(Equation 8)}$$

[Math 9]

$$\Delta G_3 = AI_3 \times \Delta I_t + AL_3 \times \Delta L_t + Am_3 \times \Delta m_3 \quad \text{(Equation 9)}$$

Here,

[Math 10]

$$\Delta G = \begin{bmatrix} \Delta G_1 \\ \Delta G_2 \\ \Delta G_3 \end{bmatrix} \quad \text{(Equation 10)}$$

[Math 11]

$$A = \begin{bmatrix} AI_1 & AL_1 & Am_1 \\ AI_2 & AL_2 & Am_2 \\ AI_3 & AL_3 & Am_3 \end{bmatrix} \quad \text{(Equation 11)}$$

[Math 12]

$$\Delta x = \begin{bmatrix} \Delta I_t \\ \Delta L_t \\ \Delta m_t \end{bmatrix} \quad \text{(Equation 12)}$$

Then,

[Math 13]

$$\Delta x = A^{-1} \Delta G \quad \text{(Equation 13)}$$

Thus, $\Delta I_t$, $\Delta L_t$, and $\Delta m_t$ can be obtained. That is, the trailer characteristic estimation unit 1a can estimate the inertia moment $I_t$, the center-of-gravity distance $L_t$, and the mass of the trailer 20 based on Formulas 7 to 13.

As described above, it is possible to estimate the inertia moment, the mass, and the center-of-gravity position of the trailer 20 at low cost without adding an additional sensor and without giving the driver the sense of incompatibility by slightly inputting the rear wheel steering angle and observing the response.

Incidentally, the change amount is assumed to be the linear expression and the simultaneous equations are solved here. However, it is unnecessary to use the linear expression, and a higher-order expression, a map, or the like may be used for the estimation. Further, the example in which the yaw rate gain is measured at the plurality of frequencies has been described, but the estimation may be performed based on responses at a plurality of speeds. Further, the estimation may be performed using a lateral acceleration and a phase instead of the yaw rate and the gain, respectively. Furthermore, the method of dividing the sine wave into a plurality of inputs has been described, but an input that superimposes a plurality of frequencies may be given to the rear wheel steering angle to estimate parameters of the trailer 20 from a response thereof, and, for example, an impulse response may be input to the rear wheel steering angle to perform estimation from the response. Further, the description has been given assuming the straight traveling, a case of steering the front wheels may be also applied. In this case, the same estimation can be performed by subtracting the influence of the front wheel steering to obtain a gain.

Next, a specific example of giving a command to each actuator based on a result of the characteristic estimation of the trailer 20 described above will be described with reference to FIG. 5. That is, when thrust is generated by the front wheel power steering motor 6b according to a torque command from the front wheel steering angle control unit 6c based on the driver's operation, a force in a turning direction is generated in the articulated vehicle 100. Incidentally, an electric power steering device using a motor is illustrated here, a hydraulic power steering system in which thrust is assisted based on the driver's operation may be used. The vehicle motion control unit 1 calculates a steering angle command to the rear wheel steering angle control unit 7c based on the estimation result of the trailer parameter estimation unit 1a described above, a vehicle motion state, and steering information of the driver. The rear wheel steering angle control unit 7c generates a torque command to a motor 28 of the rear wheel power steering based on this command.

An example of a specific method for calculating a command in the vehicle motion control unit 1 will be described below.

Assuming that steering angles of the front wheels and the rear wheels are $\delta_f$ and $\delta_r$, respectively, a turning radius is given by (Formula 14) in in a range where the speed can be regarded as constant within a linear range where the steering angle is not large.

[Math 14]

$$R = (1 + K_{sf} V^2) \frac{L}{\delta_f - \delta_r} \quad \text{(Equation 14)}$$

Here, $K_{sf}$ is called a stability factor and is a function of the trailer mass and the trailer center-of-gravity distance. V is the speed of the vehicle.

Assuming that a stability factor when the trailer mass and the trailer center-of-gravity distance are reference values is $K_{Sf0}$, a turning radius $R_0$ when the rear wheels are not steered is expressed by the following formula.

[Math 15]

$$R_0 = (1 + K_{sf0} V^2) \frac{L}{\delta_f} \quad \text{(Equation 15)}$$

Next, assuming that the stability factor when the trailer mass and the trailer center-of-gravity distance change from the reference values is $K_{sf}$, the turning radius R is expressed by Formula 16.

[Math 16]

$$R = (1 + K_{sf} V^2) \frac{L}{\delta_f} \quad \text{(Equation 16)}$$

Here, the rear wheel steering angle $\delta_r$ is controlled so as to have a value illustrated in the following Formula 17.

[Math 17]

$$\delta_r = \left(1 - \frac{R}{R_0}\right) \delta_f \quad \text{(Equation 17)}$$

That is, the rear wheel steering angle $\delta_r$ is given as a rear wheel steering angle command depending on a front wheel steering angle $\delta_f$. When inputting the rear wheel steering angle $\delta_r$ into Formula 14, R can be matched with $R_0$. Here, R is a function of $K_{sf}$, that is, a function of the trailer mass, the trailer center-of-gravity distance, and the vehicle speed, and can be calculated using the estimation results in the trailer parameter estimation unit and the vehicle speed obtained from the vehicle state sensor 2.

In this manner, in the vehicle control device 1, it is possible to turn the articulated vehicle 100 with the same front wheel steering angle and the same turning radius as those before the change by using the characteristics of the trailer 20 estimated by the trailer characteristic estimation unit 1a and Formulas 14 to 17 even when the parameter of the trailer 20 changes from the reference value, so that it is possible to improve the stability and operability. That is, the vehicle control device 1 can realize steering and acceleration control in accordance with a current state of the trailer 20 by using the inertia moment $I_t$, the center-of-gravity distance $L_t$, and the weight estimated by the trailer 20, so that it is possible to improve the stability of a posture during turning.

Incidentally, the control method is not limited thereto, and various methods can be considered. For example, the example in which the steering wheel is operated has been described here, but a command may be given to the brake control device 3 to give different brake pressures between left and right wheels so as to generate a torque in the rotation direction.

In this manner, in the present embodiment, it is possible to estimate the parameters such as the center-of-gravity position and the inertia moment of the trailer 20 without adding an additional sensor, and it is possible to improve the stability and operability of the articulated vehicle 100 during traveling (particularly during turning) by controlling the articulated vehicle 100 using these parameters.

Second Embodiment

Figure 6:
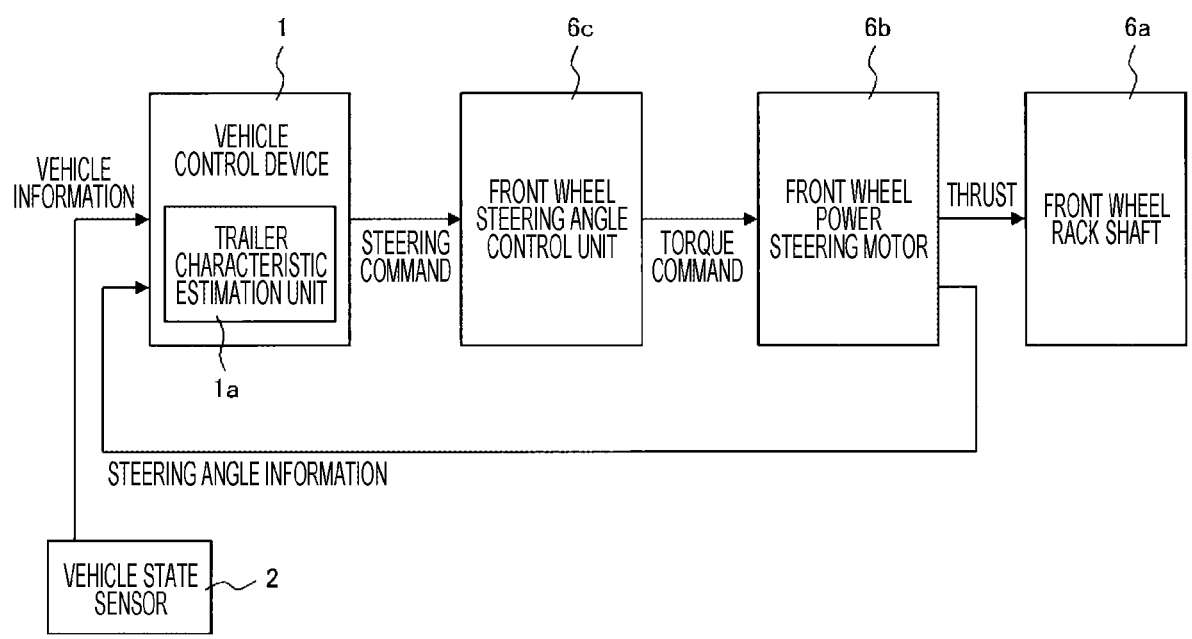
FIG. 6 is a block diagram of the main parts of the articulated vehicle of the second embodiment.

Next, a second embodiment of the present invention will be described with reference to FIG. 6. Incidentally, redundant descriptions for common points with the first embodiment are omitted.

Although a device to which a driver's steering wheel operating force is directly transmitted is used as the front wheel power steering device 6 in the first embodiment described above, the front wheel power steering device 6 of a so-called steer-by-wire system to which the driver's steering wheel operating force is not transmitted is used in the present embodiment.

Therefore, a predetermined steering angle command is given to the rear wheel power steering device 7 in the vehicle control device 1 of the first embodiment, but a predetermined steering angle command is given to the front wheel power steering device 6 in the present embodiment. Since the steer-by-wire system is used in the present embodiment, it is possible to give a steering command to the front wheels independently of the driver's steering wheel operation. The steering angle command given to the front wheel power steering device 6 is, for example, a sine wave having a specific frequency and an amplitude, and thus, the steering angle of the front wheels is generated as the sine wave.

At this time, a lateral acceleration is generated in the tractor 10, but the amplitude of the steering angle may be restricted such that the acceleration has the magnitude at the degree that people hardly sense (for example, 0.2 m/s$^2$ or less). With such steering, a yaw motion is generated in the tractor 10, and the lateral acceleration is generated, so that the vehicle state sensor 2 detects a yaw rate and lateral acceleration vibration. At this time, a gain and a phase due to a time delay are detected from the yaw rate of the tractor

10 and the amplitude of the vibration of the lateral acceleration with respect to the rear wheel steering angle $\delta_r$ at a constant frequency.

Hereinafter, a method for estimating inertia moment, a center-of-gravity position, and the mass of the trailer 20 from the gain or the phase is the same method as in the first embodiment. Further, the control based on such estimation results can also be implemented for the front wheel power steering device 6.

Further, the rear wheels may be controlled as long as a device includes the rear wheel power steering device 7. Further, the invention may be used for control of a brake and a drive device, instead of the power steering device.

As described above, the parameter estimation can be performed by steering only the front wheels in the present embodiment, and the power steering device for the rear wheels becomes unnecessary, so that the system can be simplified.

Incidentally, the present invention is not limited to the respective embodiments described above, and includes various modifications. For example, the above-described embodiments have been described in detail in order to describe the present invention in an easily understandable manner, and are not necessarily limited to one including the entire configuration thereof. Further, some configurations of a certain embodiment can be substituted by configurations of another embodiment, and further, a configuration of another embodiment can be also added to a configuration of a certain embodiment. Further, addition, deletion or substitution of other configurations can be made with respect to some configurations of each embodiment.

REFERENCE SIGNS LIST

100 articulated vehicle
1 vehicle control device
2 vehicle state sensor
3 brake control device
4 steering wheel
5 steering sensor
6 front wheel power steering device
6a front wheel rack shaft
6b front wheel power steering motor
6c front wheel steering angle control unit
7 rear wheel power steering device
7a rear wheel rack shaft
7b rear wheel power steering motor
7c rear wheel steering angle control unit
8 wheel
10 tractor
20 trailer
21 connection unit
22 center-of-gravity position of trailer
L distance between axles of tractor
$L_t$ center-of-gravity distance of trailer
$\delta_f$ Front wheel steering angle
$\delta_r$ rear wheel steering angle

The invention claimed is:

1. A vehicle control device mounted on a tractor which pulls a trailer, the vehicle control device configured to:
    control, based on a steering angle command, a steering angle of wheels of the tractor independently of steering by a driver, to control a lateral acceleration sensed by the driver based on the steering angle of the wheels of the tractor;

detect a yaw rate gain or a yaw rate phase due to a time delay from an amplitude of a yaw rate or a lateral acceleration oscillation of the tractor with respect to the steering angle; and estimate a characteristic of the trailer based on ii) a behavior of the tractor during wheel steering by the vehicle control device (ii) each behavior on a side of the tractor when the wheels are steered at different frequencies and (iii) the yaw rate gain or the yaw rate phase, wherein the characteristic of the trailer includes at least one of a center of gravity, a moment of inertia, or a mass, and wherein the steering angle command includes a sine wave such that the steering angle of the wheels is controlled in a shape of the sine wave.

2. The vehicle control device according to claim 1, further configured to estimate the characteristic of the trailer from a behavior of the trailer during a turning motion.

3. The vehicle control device according to claim 1, further configured to estimate the characteristic of the trailer from a behavior of the trailer during a lateral motion.

4. The vehicle control device according to claim 1, wherein the lateral acceleration generated when the wheels of the tractor are steered by vehicle control device is 0.2 m/s$^2$ or less.

5. The vehicle control device according to claim 1, wherein the wheels whose steering angle is controlled by the vehicle control device are rear wheels.

6. The vehicle control device according to claim 1, further configured to perform steering independent of the steering by the driver during substantially straight traveling.

7. The vehicle control device according to claim 1, further configured to control a drive system or a power steering motor of the tractor, wherein the vehicle control device controls the drive system or the power steering motor based on the characteristic estimated by the vehicle control device.

8. A characteristic estimation method for estimating a characteristic of a trailer pulled by a tractor, the characteristic estimation method comprising:

a steering angle control step of controlling, based on a steering angle command, a steering angle of wheels of the tractor independently of steering by a driver to control a lateral acceleration sensed by the driver based on the steering angle of the wheels of the tractor;

a yaw detection step of detecting a yaw rate gain or a yaw rate phase due to a time delay from an amplitude of a yaw rate or a lateral acceleration oscillation of the tractor with respect to the steering angle; and a characteristic estimation step of estimating a characteristic of the trailer based on (i) a behavior of the tractor during wheel steering in the steering angle control step (ii) each behavior on a side of the tractor when the wheels are steered at different frequencies and (iii) the yaw rate gain or the yaw rate phase, wherein the characteristic of the trailer includes at least one of a center of gravity, a moment of inertia, or a mass, and wherein the steering angle command includes a sine wave such that the steering angle of the wheels is controlled in a shape of the sine wave.

9. The characteristic estimation method according to claim 8, wherein in the characteristic estimation step, the characteristic of the trailer is estimated from a behavior of the trailer during a turning motion.

10. The characteristic estimation method according to claim 8, wherein in the characteristic estimation step, the characteristic of the trailer is estimated from a behavior of the trailer during a lateral motion.

11. The characteristic estimation method according to claim 8, wherein in the steering angle control step, the lateral acceleration generated during the wheel steering of the tractor is 0.2 m/s$^2$ or less.

12. The characteristic estimation method according to claim 8, wherein the wheels whose steering angle is controlled in the steering angle control step are rear wheels.

13. The characteristic estimation method according to claim 8, wherein the steering angle control step is performed during substantially straight traveling.

* * * * *